(12) United States Patent
Koenig

(10) Patent No.: US 10,630,426 B2
(45) Date of Patent: *Apr. 21, 2020

(54) REDUNDANCY INFORMATION FOR A PACKET DATA PORTION

(71) Applicant: Microsoft Technology Licensing, LLC, Redmond, WA (US)

(72) Inventor: Lionel Koenig, Bandhagen (SE)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/810,763

(22) Filed: Nov. 13, 2017

(65) Prior Publication Data

US 2018/0069661 A1 Mar. 8, 2018

Related U.S. Application Data

(63) Continuation of application No. 15/012,524, filed on Feb. 1, 2016, now Pat. No. 9,819,448.

(30) Foreign Application Priority Data

Mar. 6, 2015 (GB) .................................. 1503828.4

(51) Int. Cl.
*H04L 1/00* (2006.01)
(52) U.S. Cl.
CPC ............ *H04L 1/0084* (2013.01); *H04L 1/008* (2013.01)
(58) Field of Classification Search
CPC .............................. H04L 1/008; H04L 1/0084
See application file for complete search history.

(56) References Cited

U.S. PATENT DOCUMENTS

| 5,870,412 | A | 2/1999 | Schuster et al. |
| 6,141,788 | A | 10/2000 | Rosenberg et al. |
| 6,145,109 | A | 11/2000 | Schuster et al. |
| 6,170,075 | B1 | 1/2001 | Schuster et al. |
| 6,243,846 | B1 | 6/2001 | Schuster et al. |
| 6,487,690 | B1 | 11/2002 | Schuster et al. |
| 6,694,478 | B1 | 2/2004 | Martinian et al. |

(Continued)

FOREIGN PATENT DOCUMENTS

| EP | 2720398 | 4/2014 |
| WO | WO-2006056832 | 6/2006 |

(Continued)

OTHER PUBLICATIONS

"International Preliminary Report on Patentability", Application No. PCT/EP2016/054172, dated May 30, 2017, 7 pages.

(Continued)

*Primary Examiner* — Stephen J Clawson
(74) *Attorney, Agent, or Firm* — Schwegman Lundberg & Woessner, P.A.

(57) ABSTRACT

Implementations described herein utilize redundancy information for packet data portions. For instance, a first packet includes multiple data portions. A second packet is generated that includes redundancy information for one or more of the multiple data portions of the first packet. In at least some implementations, the redundancy information can be used to determine whether an error condition occurs related to the first packet, such as data errors and/or a dropped data portion.

36 Claims, 5 Drawing Sheets

(56) References Cited

U.S. PATENT DOCUMENTS

| | | | |
|---|---|---|---|
| 6,728,924 | B1 | 4/2004 | Lou et al. |
| 6,757,654 | B1 | 6/2004 | Westerlund et al. |
| 7,042,833 | B1 | 5/2006 | George et al. |
| 9,819,448 | B2 | 11/2017 | Koenig |
| 2001/0002906 | A1 | 6/2001 | Rune |
| 2002/0054608 | A1 | 5/2002 | Wan et al. |
| 2004/0078411 | A1* | 4/2004 | Porten .................. G06F 7/724 708/492 |
| 2008/0192738 | A1 | 8/2008 | Florencio et al. |
| 2011/0077940 | A1 | 3/2011 | Vos et al. |
| 2011/0283156 | A1 | 11/2011 | Hiie |
| 2013/0051479 | A1 | 2/2013 | Won et al. |
| 2013/0094517 | A1 | 4/2013 | Kim et al. |
| 2015/0078372 | A1 | 3/2015 | Mani et al. |
| 2016/0261376 | A1 | 9/2016 | Koenig |
| 2017/0103761 | A1 | 4/2017 | Sun et al. |

FOREIGN PATENT DOCUMENTS

| | | |
|---|---|---|
| WO | WO-2007065458 | 6/2007 |
| WO | WO-2013109956 | 7/2013 |

OTHER PUBLICATIONS

"International Search Report and Written Opinion", Application No. PCT/EP2016/054172, dated May 31, 2016, 11 pages.

"Notice of Allowance", U.S. Appl. No. 15/012,524, dated Jul. 12, 2017, 8 pages.

"Second Written Opinion", Application No. PCT/EP2016/054172, dated Feb. 17, 2017, 5 pages.

Korhonen,"Generic forward error correction of short frames for IP streaming applications", In Proceedings of Multimedia Tools and Applications, Jun. 16, 2006, 19 pages.

Koul,"An N+1 redundant GOP based FEC algorithm for improving Streaming Video Quality due to Packet Loss and Delay Jitter", In Proceedings of International Conference on Emerging Technologies, Nov. 12, 2007, 6 pages.

Perkins,"RTP Payload for Redundant Audio Data", in RFC, RTP Payload for Redundant Audio Data, Sep. 1997, 23 pages.

Spittka,"RTP Payload Format for Opus Speech and Audio Codec", Available at: http://www.potaroo.net/ietf/idref/draft-ietf-payload-rtp-opus/, Nov. 13, 2014, 17 pages.

* cited by examiner

REDUNDANCY INFORMATION FOR A PACKET DATA PORTION

RELATED APPLICATIONS

This application is a continuation of and claims priority to U.S. patent application Ser. No. 15/012,524, titled "Redundancy Scheme", and filed Feb. 1, 2016, which in turn claims priority under 35 U.S.C. § 119(b) to Great Britain Patent Application Serial Number 1503828.4, titled "Redundancy Scheme" and filed on Mar. 6, 2015, the entire disclosures of which are incorporated by reference herein.

BACKGROUND

When transmitting time-sensitive data, such as real-time audio and/or video data, communication schemes may use redundancy information to improve the reliability of communications. For example, a packet may be transmitted with redundancy information of/for a previous packet. The redundancy information may be used to resolve what was in the previous packet. This type of technique uses a larger amount of forward overhead than techniques that rely on requesting re-transmissions, but is useful for time-sensitive data.

Low Bitrate Redundancy (LBRR) is one type of redundancy scheme. In LBRR a very low bitrate encoded version of the immediately preceding packet is embedded in a current packet. This is illustrated in FIG. 3, in which three packets, P1, P2, P3, are shown. Within each packet, there is comprised a shaded region representative of redundancy information for a preceding packet. P1 is the first (and oldest) packet. Although P1 has the space for redundancy information, P1 has no preceding packet and so does not comprise redundancy information relating to a previous packet. P2 is the second packet and is sent immediately after P1. As P1 is the packet immediately preceding P2, P2 comprises redundancy information for P1. More particularly, P2 comprises an encoded version of P1 that might, but not necessarily, have a lower bit-rate than P1. This is represented by the shaded box labelled "P1" in P2. P3 is the third packet and is sent immediately after P2. As P2 is the packet immediately preceding P3, P3 comprises redundancy information for P2. More particularly, P3 comprises an encoded version of P2 that might, but not necessarily, have a lower bit-rate than P2. This is represented by the shaded box labelled "P2" in P3. Such a scheme of sending extra information for recovering a lost packet is also known as Forward Error Correction.

Some codecs (a codec is a device or mechanism for encoding and/or decoding data) allow for several payloads to be sent in a single packet. A payload is a unit of data specified for transmission by a protocol operating at a higher level (higher layer) than the codec, such as a protocol operating at the application layer. Thus a codec payload is a unit of data understood by the codec. The payload may be passed to a codec, which forms a packet comprising multiple payloads. Although the multiple payloads may be sometimes individually referred to as "payloads", it is understood that these are in fact smaller, constituent payloads forming the overall packet payload (for example, by aggregation). For the rest of the description, the term "payload" will be used to denote the total packet payload whilst the term "sub-payload" will be used to denote any of the smaller payloads that in combination make up a packet. The sub-payloads may make up a packet by concatenation (where the sub-payloads are simply added one after the other into the packet to be transmitted), or by using a repacketization scheme (where the sub-payloads are reformatted prior to insertion into a packet).

An example of a packet comprising multiple sub-payloads is shown in FIG. 4. Two packets are shown in FIG. 4: P1' and P2'. P1' comprises three sub-payloads, P1.1', P1.2' and P1.3'. In the present example, the sub-payloads are sorted in a time ordered manner, according to the order in which the sub-payloads arrive at the codec (i.e. as input at the transmit side). Sub-payload P1.1' is the first sub-payload in P1' and is so the oldest sub-payload in packet P1'. In other words, sub-payload P1.1' arrived at the transmitter's codec prior to all of the other sub-payloads. Thus sub-payload P1.1' does not comprise any redundancy information. Sub-payload P1.2' is the second sub-payload in P1' and so comprises redundancy information for sub-payload P1.1'. Sub-payload P1.3' is the third sub-payload in P1' and so comprises redundancy information for sub-payload 1.2'. Packet P2' comprises three sub-payloads, P2.1', P2.2' and P2.3'. Sub-payload P2.1' is the first sub-payload in P2'. As there was a preceding sub-payload (P1.3'), sub-payload P2.1' comprises redundancy information for sub-payload P1.3'. Sub-payload P2.2' is the second sub-payload in P2' and comprises redundancy information for sub-payload P2.1'. Sub-payload 2.3' is the third sub-payload in P2' and so comprises redundancy information for sub-payload 2.2'.

SUMMARY

The inventor has realised that, with the prior art illustrated in FIG. 4, then if, for example, packet P1' is lost, only redundancy information for sub-payload P1.3' is available in packet P2'. Consequently, only one of the sub-payloads present in packet P1' has a chance of being recovered by a receiver of packet P2'.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

According to a first aspect, there is disclosed an apparatus comprising at least one processor and a memory comprising code that, when executed on the at least one processor, causes the apparatus to perform several actions. In particular, the executing code causes the apparatus to attempt to receive a first packet comprising multiple sub-payloads having an order from first to last, to receive a second packet comprising multiple sub-payloads having an order from first to last, and to use redundancy information comprised within the sub-payloads of the second packet to determine information in relation to the first packet. For example, the determined information may be a determination that information has been lost or corrupted from the first packet, including the loss of the first packet as a whole. The first sub-payload in the second packet comprises redundancy information for the last sub-payload in the first packet and the second sub-payload in the second packet comprises redundancy information for a sub-payload other than the last sub-payload in the first packet.

According to a second aspect there is disclosed an apparatus comprising at least one processor and a memory comprising code that, when executed on the at least one processor, causes the apparatus to perform several actions. In particular, the executing code causes the apparatus to transmit a first packet comprising multiple sub-payloads having an order from first to last, to transmit a second packet comprising multiple sub-payloads having an order from first to last, wherein the first sub-payload in the second packet comprises redundancy information for the last sub-payload in the first packet and the second sub-payload in the second packet comprises redundancy information for a sub-payload other than the last sub-payload in the first packet, and to use the redundancy information to determine information in relation to the first packet.

According to a third aspect there is disclosed method comprising the steps of: attempting to receive a first packet comprising multiple sub-payloads having an order from first to last, receiving a second packet comprising multiple sub-payloads having an order from first to last (wherein the first sub-payload in the second packet comprises redundancy information for the last sub-payload in the first packet and the second sub-payload in the second packet comprises redundancy information for a sub-payload other than the last sub-payload in the first packet) and using the redundancy information to determine information in relation to the first packet.

FIGURES

For a better understanding of the subject matter and to show how the same may be carried into effect, reference will now be made by way of example only to the following drawings in which.

DETAILED DESCRIPTION

Figure 4:
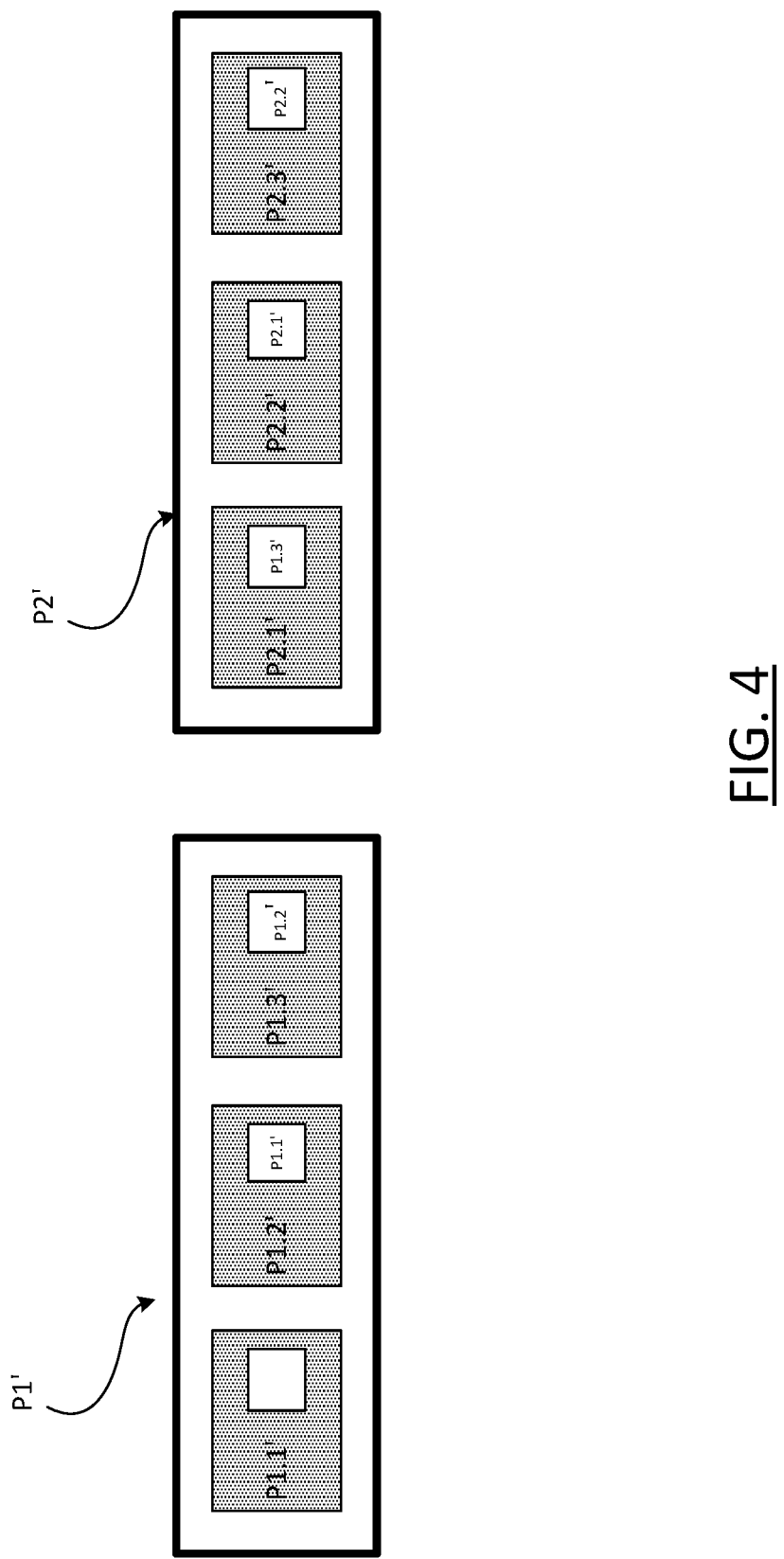
FIG. 4 illustrates example packets.

The following is directed towards a multi-sub-payload packet format that aims to provide for a more reliable transmission mechanism than that shown in FIG. 4. In particular, the following discloses a packet format in which redundancy information for multiple sub-payloads in a previous packet are comprised within a subsequent packet.

Figure 5:
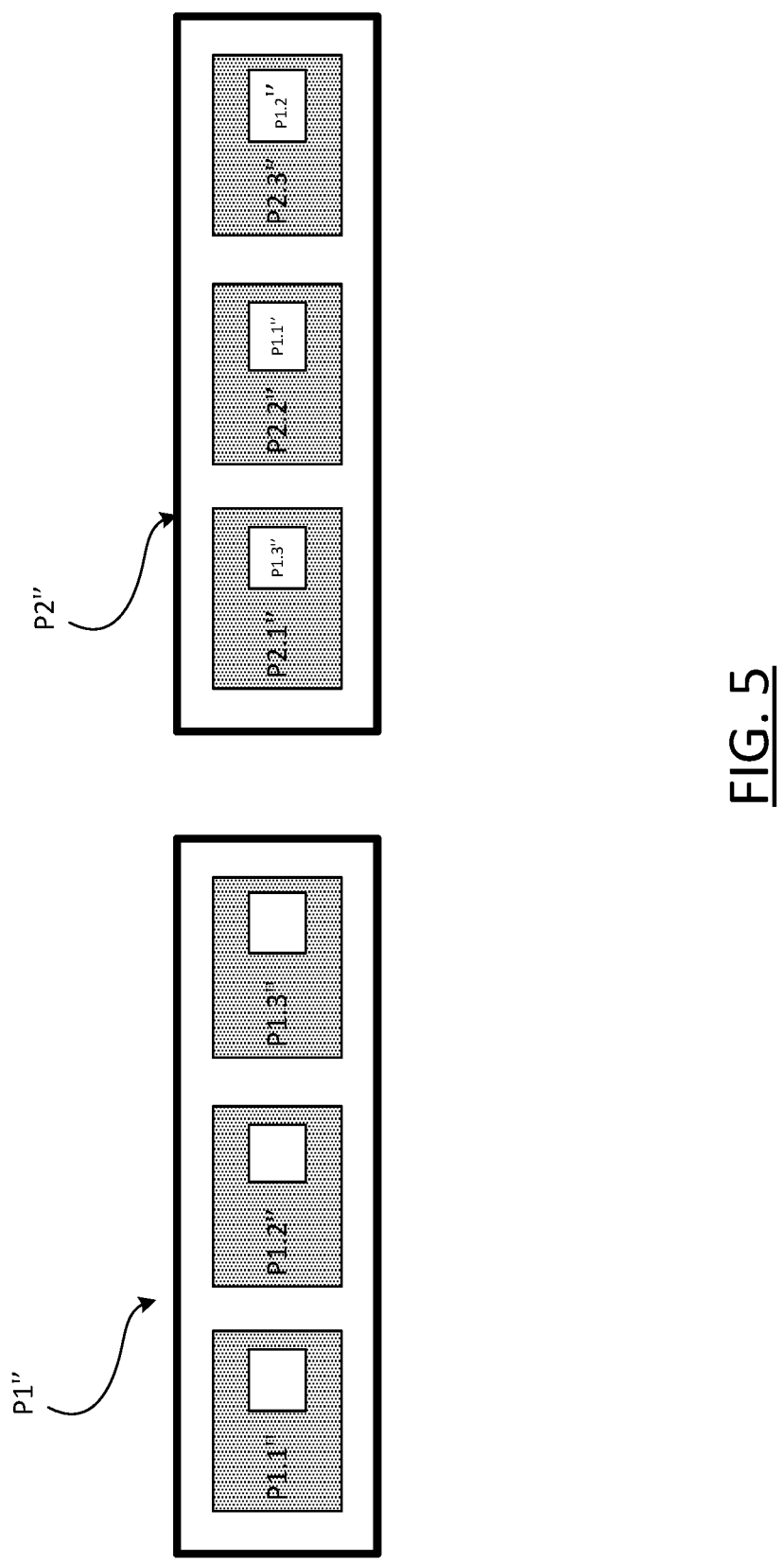
FIG. 5 illustrates packets according to an embodiment of the present disclosure.

An example multi-sub-payload packet format is shown in FIG. 5. FIG. 5 shows two packets: P1" and P2". Packet P1" comprises three sub-payloads, P1.1", P1.2" and P1.3", having an order from first to last. Packet P2" may be transmitted by a transmitter after packet P1" with no intervening transmission by the transmitter. Alternatively, Packet P2" may be transmitted by the transmitter after packet P1" with intervening transmissions made by the transmitter. Packets P1" and P2" may, however, be considered as being part of the same stream (e.g. by having the same session ID and/or comprising information relating to the same chain of communication). Packet P2" comprises three sub-payloads, P2.1", P2.2" and P2.3", having an order from first to last. It is understood that the number of packets and number of sub-payloads shown is for example only and that the present disclosure may be applied equally to other numbers of packets and sub-payloads. Further, as mentioned above, it is understood that other packets may be transmitted between the first and second packets, depending on the particular protocol being implemented. It is important that the format of the packet be such that the redundancy information associated with the first sub-payload in the second packet be in accordance with the operating protocol for compatibility with the operating protocol (e.g. for compatibility with RFC 6716).

The sub-payloads are described as having an order from first to last. This order is determined at the codec at the transmit side. The codec receives the data for the sub-payloads and is configured to form a packet comprising a number of sub-payloads. The transmitter-side codec may be configured to form the packets so that the sub-payloads are ordered in the packets in the order in which they arrive at the codec. For example, the sub-payload that arrives at the codec first may be transmitted first in the packet, the sub-payload that arrives at the codec second may be transmitted second the packet, and so on. The transmitter-side codec may be configured to form the packets so that the payloads are not ordered in the packets in the order in which they arrive. For example, the sub-payloads may be ordered according to a priority associated with their transmission. In this case, the priority may be signalled to the codec from an entity operating at a higher layer (such as an application). The transmitter-side codec may be arranged to form a plurality of packets and then transmit those packets in an order determined by a predetermined scheme. For example, the packets may be transmitted in dependence on the age of the sub-packets they comprise so that the oldest data is transmitted first. This helps to improve the latency of the scheme. Alternatively, the packets may be transmitted in a non-chronological manner to improve robustness.

Sub-payload 1.1" is the first sub-payload in the first packet P1". Packet P1" is considered to be the first packet in the present communication chain and so there are no preceding packets. Consequently, sub-payload P1.1" does not comprise any redundancy information. Sub-payloads P1.2" and P1.3" (respectively the second and third sub-payloads in packet P1") also do not comprise any redundancy information, despite there being prior sub-payloads in the communication chain. This is different to the prior art situation illustrated in FIG. 4 in which redundancy information for sub-payloads P1.1' and P1.2' are comprised within sub-payloads P1.2' and P1.3' respectively.

Sub-payload 2.1" is the first sub-payload in the second packet P2" and comprises redundancy information for sub-payload 1.3". In other words, the first sub-payload of packet P2" comprises redundancy information for the immediately preceding sub-payload (P1.3"). Sub-payload P2.2" is the second sub-payload in packet P2" and comprises redundancy information for sub-payload P1.1". In other words, the second sub-payload of packet P2" comprises redundancy information for a sub-payload in the immediately preceding packet (P1"). This is different to the prior art situation illustrated in FIG. 4. Sub-payload P2.3" is the third sub-payload in packet P2" and comprises redundancy information for sub-payload P1.3". In other words, the third sub-payload of packet P2" comprises redundancy information for a sub-payload in the immediately preceding packet (P1"). This is different to the prior art situation in FIG. 4.

The example illustrated with respect to FIG. 5 can be described more generally as follows. In a system configured to operate using multi-sub-payload packets, at least two packets are transmitted (either immediately one after the other or with intervening transmissions) by a transmitter for reception by a receiver. The packets are sent such that one packet may be considered a first packet and the other packet may be considered the second packet. The first packet is transmitted before the second packet is transmitted. Both the first and second packets comprise multiple (i.e. at least two) sub-payloads having an order from first to last. The first sub-payload in the second packet comprises redundancy information for the last sub-payload in the first packet. In other words, the oldest sub-payload in the second packet comprises redundancy information for the youngest sub-payload in the first packet, with the age of the sub-payload being dependent on the transmit sequence determined by the codec. Further, the second sub-payload in the second packet comprises redundancy information for a sub-payload other than the last sub-payload in the first packet. The redundancy information may be comprised within the sub-payloads by being embedded therein. Alternatively, the redundancy information may be embodied as a sub-payload within a packet, with some form of marker to indicate that that sub-payload is redundancy information for a previously transmitted sub-payload. The redundancy information for multiple sub-payloads in the second packet allows for the possibility of recovering multiple sub-payloads from the first packet. This is useful in the event that the first packet is not successfully received, e.g. when the first packet is not received or is improperly received by the receiver.

The redundancy information provided in the second packet is used to determine information about the first packet. For example, the redundancy information provided in the second packet may be used to detect errors and/or loss of at least one sub-payload of the first packet. Alternatively or in addition, the redundancy information provided in the second packet may be used to repair and/or correct errors determined to be present in at least one sub-payload of the first packet. The receiver may be configured to detect/determine errors and/or the loss of at least one sub-payload of the first packet. The receiver may be configured to detect/determine such things using at least one of a variety of different methods. For example, the receiver may be configured using at least one of: an out of band signalling mechanism; a pre-agreed configuration; and in response to a detection that the scheme used in the payload. The receiver may be further configured to repair and/or correct errors determined to be present in at least one sub-payload of the first packet.

A benefit of structuring the redundancy information such that the first sub-payload in the second packet is associated with the redundancy information of the last sub-payload of the first packet is that the proposed structure is compatible with protocols configured to operate using the scheme outlined with respect to FIG. 4. In other words, it is bitstream compatible with the format illustrated in FIG. 4. Further, assuming that the first packet is not successfully received, receivers configured to operate according to the packet structure of FIG. 4 will still be able to recover the same amount of information as when the first packet is not successfully received in the example of FIG. 4 (i.e. only sub-payload P1.3" may be recovered from the redundancy information). However, those receivers that are configured for operation with the present structure may be able to recover all of the sub-payloads from the first packet using the redundancy information contained in the second packet.

According to one aspect, for each sub-payload there is associated therewith redundancy information for only one sub-payload from a previous packet. This is useful for minimising the size of sub-payloads.

According to another aspect, redundancy information is not repeated across a packet. In other words, redundancy information for a particular sub-payload is only present in a packet once. This assists in reducing replication of redundancy information, as the redundancy information for a sub-payload is only ever provided once. To this aim, redundancy information for a particular packet may only be provided once in a packet. It is understood that, in other embodiments, the redundant sub-payload may be transmitted multiple times e.g. multiple times in the same packet or multiple times across several packets.

According to another aspect, the second packet comprises redundancy information for every sub-payload in the first packet. This also means that there are at least as many sub-payloads in the second packet as in the first packet. By providing redundancy information for every sub-payload in the first packet, all of the sub-payloads of the first packet may be recovered in the event that the first packet is not successfully received.

According to another aspect, the first packet and second packets are transmitted using the same protocol. The first packet immediately precedes the second packet, such that no other packets according to that protocol are transmitted between the first and second packets. It is understood that this is merely one embodiment and, as previously mentioned, the first and second packets do not have to be consecutive.

It is understood that any number of the above-mentioned aspects may be combined in a single embodiment without any loss of generality.

Figure 1:
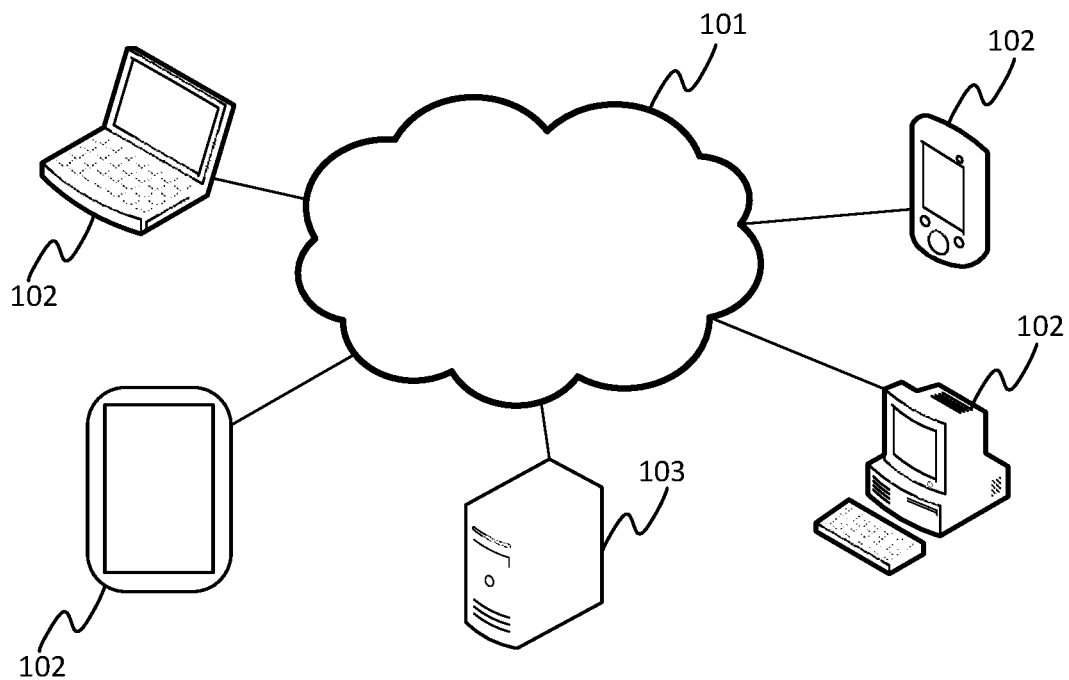
FIG. 1 is a schematic illustration of a communication system.

FIG. 1 shows an example of a communication system in which the teachings of the present disclosure may be implemented. The system comprises a communication medium 101, in embodiments a communication network such as a packet-based network, for example comprising the Internet and/or a mobile cellular network (e.g. 3GPP network). The system further comprises a plurality of user terminals 102, each operable to connect to the network 101 via a wired and/or wireless connection. For example, each of the user terminals may comprise a smartphone, tablet, laptop computer or desktop computer. In embodiments, the system also comprises a server 103 connected to the network 101. It is understood, however, that a server may not be used in certain circumstances, such as some peer-to-peer real-time communication protocols. The term server as used herein refers to a logical server, which may comprise one or more physical server units at one or more physical sites (i.e. the server 103 may or may not be distributed over multiple different geographic locations).

Figure 2:
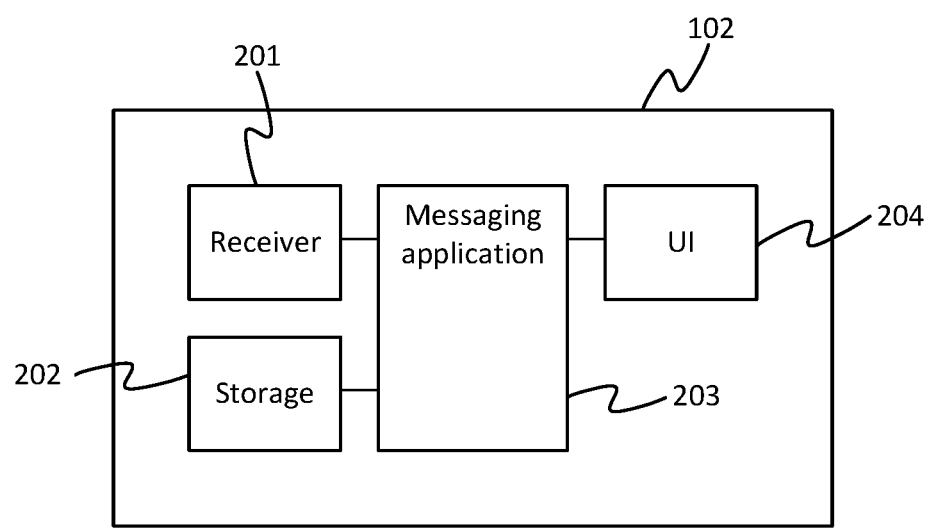
FIG. 2 is a schematic block-diagram of a user device.
Figure 3:
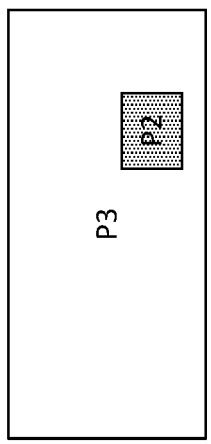
FIG. 3 illustrates example packets.
Figure 3:
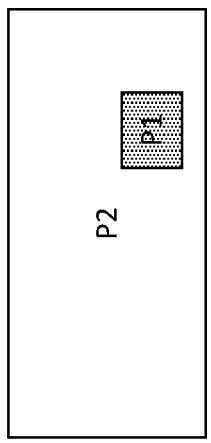
Figure 3:
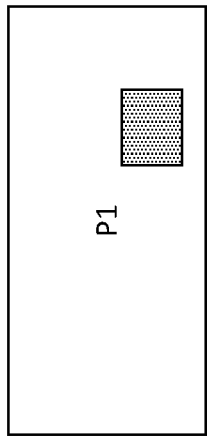

FIG. 2 shows an example of one of the user terminals 102 in accordance with embodiments disclosed herein. The user terminal 102 comprises a receiver 201 for receiving data from one or more others of the user terminals 102 over the communication medium 101, e.g. a network interface such as a wired or wireless modem for receiving data over the Internet or a 3GPP network. The user terminal 102 also comprises a non-volatile storage 202, i.e. non-volatile memory, comprising one or more internal or external non-volatile storage devices such as one or more hard-drives and/or one or more EEPROMs (sometimes also called flash memory). Further, the user terminal comprises a user interface 204 comprising at least one output to the user, e.g. a display such as a screen, and/or an audio output such as a speaker or headphone socket. The user interface 204 will typically also comprise at least one user input allowing a user to control the user terminal 102, for example a touchscreen, keyboard and/or mouse input.

Furthermore, the user terminal 102 comprises a messaging application 203, which is configured to receive messages from a complementary instance of the messaging application on another of the user terminals 102, or the server 103 (in which cases the messages may originate from a sending user terminal sending the messages via the server 103, and/or may originate from the server 103).

The messaging application is configured to receive the messages over the network 101 (or more generally the communication medium) via the receiver 201, and to store the received messages in the storage 202. For the purpose of the following discussion, the described user terminal 102 will be considered as the receiving (destination) user terminal, receiving the messages from one or more other, sending ones of the user terminals 102. Further, any of the following may be considered to be the entity immediately communicating with the receiver: as a router, a hub or some other type of access node located within the network 101. It will also be appreciated that the messaging application 203 receiving user terminal 102 may also be able to send messages in the other direction to the complementary instances of the application on the sending user terminals and/or server 103 (e.g. as part of the same conversation), also over the network 101 or other such communication medium.

The messaging application may transmit audio and/or video data using any one of a variety of communication protocols/codecs. For example, audio data may be formatted using a protocol known such as Opus (as defined in RFC 6716), which may use a repacketization scheme for combining multiple audio payloads into a single packet.

Redundancy information can be generated as part of a forward error correction (FEC) technique. FEC techniques rely on a transmitter encoding data in a redundant way using an error-correcting code, such as a Reed-Solomon code or a Hamming code. The redundancy allows a receiver of the encoded data the ability to detect errors in the received transmission. Instead of coding/FEC techniques, the redundancy information may alternatively be based on pattern recognition techniques or linear prediction techniques.

Figure 6:
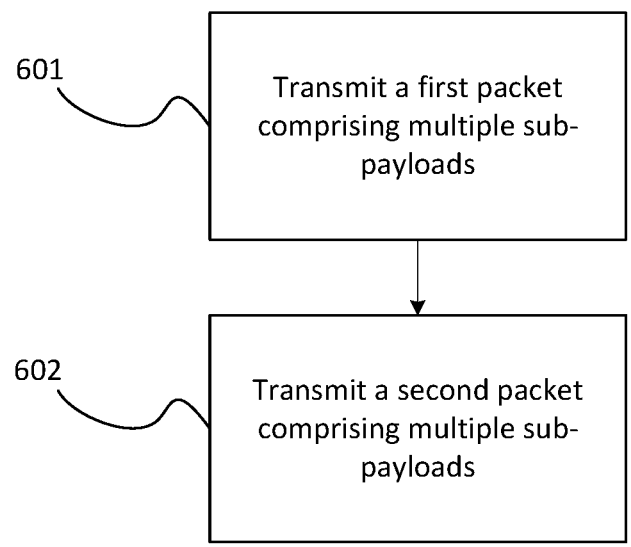
FIG. 6 is a flowchart illustrating operations of an example transmitter.

In operation, a transmitter is configured to transmit packets comprising multiple sub-payloads for reception by a receiver. This process is illustrated with respect to the flow chart in FIG. 6. The transmitter comprises at least one processor and a memory comprising code that, when executed on the at least one processor, causes the transmitter perform the steps of FIG. 6. In step 601, the transmitter is configured to transmit a first packet comprising multiple sub-payloads. In step 602, the transmitter transmits a second packet comprising multiple sub-payloads. The first sub-payload in the second packet comprises redundancy information for the last sub-payload in the first packet and the second sub-payload in the second packet comprises redundancy information for a sub-payload other than the last sub-payload in the first packet. It is understood that the terms first packet and second packet are merely used to indicate the order in which the transmitter transmits the packets, with the first packet being transmitted before the second packet in the present example. The packets may be transmitted based on the chronological order of the data they contain, such that the packet comprising the oldest data is transmitted first. The data may comprise a timestamp that can be used for this purpose. However, as mentioned above, it is understood that the packets do not have to be sent in a consecutive order, such that the packets comprising the oldest data is transmitted first. Transmitting the packets in a non-chronological order will add to the latency of the system but it will also increase the robustness of the system against burst loss of minimum distance between the packets without an increase in bandwidth consumption.

Similarly, the last sub-payload of the first packet is the last sub-payload to be transmitted by the transmitter out of the sub-payloads comprised within the first packet. The above described transmitter operations may not start at the beginning of a data stream (relating, perhaps, to an audio or video call). Instead, the transmitter operations may start being applied mid-stream. Further, the above-described transmitter operations may be stopped and restarted during the stream/call, depending on the particular implementation adopted by the skilled person.

The memory on the transmitter may further comprise code that, when executed on the at least one processor, causes the transmitter to receive sub-payloads for the first and second packets and form the first and second packets by placing a predetermined number of sub-payloads into each of the first and second packets. The sub-payloads may be received from a higher layer process running on the transmitter (or from another entity that passes the sub-payload to the transmitter for transmission to the receiver). The memory of the transmitter may further comprise code that, when executed on the at least one processor, causes the transmitter to form the first and second packets by re-formatting each of the received sub-payloads prior to placing the predetermined number of sub-payloads into each of the first and second packets. In other words, the transmitter may be configured to re-packetise the received sub-payloads prior to forming the packet in which they are to be inserted.

Figure 7:
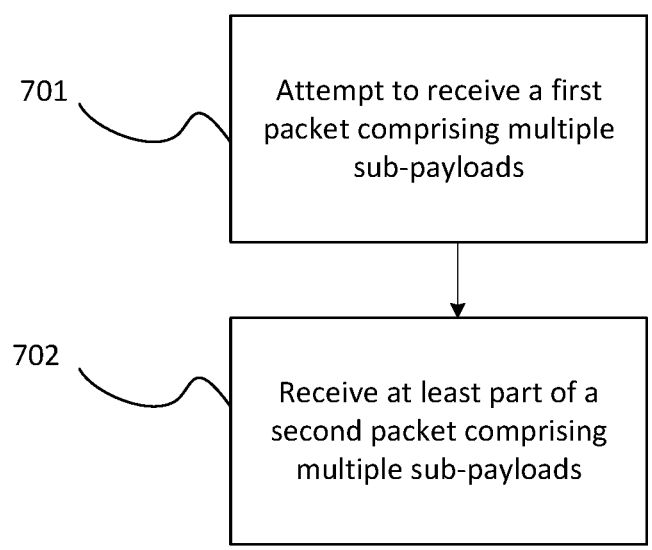
FIG. 7 is a flowchart illustrating operations of an example receiver.

There is also provided a receiver comprising at least one processor and a memory comprising code that, when executed on the at least one processor, causes the apparatus to perform the steps illustrated with respect to FIG. 7. In step 701, the receiver is configured to attempt to receive a first packet comprising multiple sub-payloads. By "attempt", it is meant that the receiver may receive at least part (including the whole) of the first packet, but it may be that the receiver fails to receive the first packet at all, as the transmissions may be being conducted over a lossy link. In step 702, the receiver is configured to receive at least part of a second packet comprising multiple sub-payloads. The first sub-payload in the second packet comprises redundancy information for the last sub-payload in the first packet and the second sub-payload in the second packet comprises redundancy information for a sub-payload other than the last sub-payload in the first packet. In other words, the receiver is configured to receive data packets in the form of those transmitted by the transmitter.

In general, the memory of the receiver comprises code that, when executed on the at least one processor, causes the apparatus to use the redundancy information to recover sub-payload information from a previously transmitted packet. The previously transmitted packet may be the first packet (mentioned above). If there have been multiple packets transmitted prior to the second packet, the previously transmitted packet may be one of those multiple packets.

For example, if the last sub-payload of the previous packet was not received successfully, the memory of the receiver may comprise code that, when executed on the at least one processor, causes the receiver to use the redundancy information for the last sub-payload of the first packet to determine whether the last sub-payload of the first packet was successfully received in the first packet. If the last sub-payload of the first packet was not successfully received, the receiver may be configured to use the redundancy information for the last sub-payload of the first packet to recover the last sub-payload of the first packet.

Alternatively or in addition, if another sub-payload of the previous packet was not received successfully, the memory of the receiver may comprise code that, when executed on the at least one processor, causes the receiver to use the redundancy information for the other sub-payload (i.e. the sub-payload other than the last sub-payload) to determine whether the other sub-payload was successfully received in the first packet and if the other sub-payload was not successfully received, use the redundancy information for the other sub-payload to recover the other sub-payload.

The decoder at the receiver may detect the form of the incoming packets (i.e. the multiple sub-payload packet) by analysis of the incoming data packets. Alternatively or in addition, the receiver may be informed of the form of the incoming packets via out-of-band signalling.

In the embodiment described above, the redundancy information may be in the form of a lower bitrate version of the sub-payload to which it corresponds. The term lower bitrate version is understood in this context to include at least partial information of the sub-payload to which it corresponds. This can be useful for saving bandwidth on retransmissions. However, it is understood that redundancy information may take other forms. In the general case, redundancy information for a particular sub-payload may be taken to mean information that replicates (in some form) at least part of that particular sub-payload or that can otherwise be used to recover at least part of the particular sub-payload.

The second sub-payload in the second packet may comprise redundancy information for the first sub-payload in the first packet.

The first sub-payload in the second packet may comprise redundancy information for only the last sub-payload of the first packet.

The second packet may comprise a predetermined number of sub-payloads, each sub-payload comprising respective redundancy information for the last sub-payload of a predetermined number of packets. In other words, if there are "N" preceding packets to the second packet and N sub-payloads in the second packet, each sub-payload in the second packet may comprise a respective last sub-payload of the N preceding packets.

The redundancy information for a sub-payload other than the last sub-payload in the first packet may correspond to redundancy information for a sub-payload in the first packet.

Generally, any of the functions described herein can be implemented using software, firmware, hardware (e.g., fixed logic circuitry), or a combination of these implementations. The terms "module," "functionality," "component" and "logic" as used herein generally represent software, firmware, hardware, or a combination thereof. In the case of a software implementation, the module, functionality, or logic represents program code that performs specified tasks when executed on a processor (e.g. CPU or CPUs). Where a particular device is arranged to execute a series of actions as a result of program code being executed on a processor, these actions may be the result of the executing code activating at least one circuit or chip to undertake at least one of the actions via hardware. At least one of the actions may be executed in software only. The program code can be stored in one or more computer readable memory devices. The features of the techniques described below are platform-independent, meaning that the techniques may be implemented on a variety of commercial computing platforms having a variety of processors.

For example, the user terminals configured to operate as described above may also include an entity (e.g. software) that causes hardware of the user terminals to perform operations, e.g., processors functional blocks, and so on. For example, the user terminals may include a computer-readable medium that may be configured to maintain instructions that cause the user terminals, and more particularly the operating system and associated hardware of the user terminals to perform operations. Thus, the instructions function to configure the operating system and associated hardware to perform the operations and in this way result in transformation of the operating system and associated hardware to perform functions. The instructions may be provided by the computer-readable medium to the user terminals through a variety of different configurations.

One such configuration of a computer-readable medium is signal bearing medium and thus is configured to transmit the instructions (e.g. as a carrier wave) to the computing device, such as via a network. The computer-readable medium may also be configured as a computer-readable storage medium and thus is not a signal bearing medium. Examples of a computer-readable storage medium include a random-access memory (RAM), read-only memory (ROM), an optical disc, flash memory, hard disk memory, and other memory devices that may us magnetic, optical, and other techniques to store instructions and other data.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As described in the above, there is provided an apparatus comprising at least one processor; and a memory comprising code that, when executed on the at least one processor, causes the apparatus to: attempt to receive a first packet comprising multiple sub-payloads having an order from first to last; receive a second packet comprising multiple sub-payloads having an order from first to last, wherein the first sub-payload in the second packet comprises redundancy information for the last sub-payload in the first packet and the second sub-payload in the second packet comprises redundancy information for a sub-payload other than the last sub-payload in the first packet; and use the redundancy information to determine information in relation to the first packet.

The memory may further comprise code that, when executed on the at least one processor, causes the apparatus to use the redundancy information for the last sub-payload to determine whether the last sub-payload was successfully received in the first packet; and if the last sub-payload was not successfully received, use the redundancy information for the last sub-payload to recover the last sub-payload.

The memory may further comprise code that, when executed on the at least one processor, causes the apparatus to use the redundancy information for the sub-payload other than the last sub-payload to determine whether the sub-payload other than the last sub-payload was successfully received in the first packet; and if the sub-payload other than the last sub-payload was not successfully received, use the redundancy information for the sub-payload other than the last sub-payload to recover the sub-payload other than the last sub-payload.

The redundancy information may be in the form of a lower bitrate version of the sub-payload to which it corresponds.

The second sub-payload in the second packet may comprise redundancy information for the first sub-payload in the first packet.

The first sub-payload in the second packet may comprise redundancy information for only the last sub-payload of the first packet.

The second packet may comprise a predetermined number of sub-payloads, each sub-payload comprising respective redundancy information for the last sub-payloads of a predetermined number of packets.

The redundancy information for a sub-payload other than the last sub-payload in the first packet may correspond to redundancy information for a sub-payload in the first packet.

The memory may further comprise code that, when executed on the at least one processor, causes the apparatus to use the redundancy information to recover sub-payload information from a previously transmitted packet.

There is also provided an apparatus comprising: at least one processor; and a memory comprising code that, when executed on the at least one processor, causes the apparatus to: transmit a first packet comprising multiple sub-payloads having an order from first to last; transmit a second packet comprising multiple sub-payloads having an order from first to last, wherein the first sub-payload in the second packet comprises redundancy information for the last sub-payload in the first packet and the second sub-payload in the second packet comprises redundancy information for a sub-payload other than the last sub-payload in the first packet; and use the redundancy information to determine information in relation to the first packet.

The redundancy information may be in the form of a lower bitrate version of the sub-payload to which it corresponds.

The second sub-payload in the second packet may comprise redundancy information for the first sub-payload in the first packet.

The first sub-payload in the second packet may comprise redundancy information for only the last sub-payload of the first packet.

The second packet may comprise a predetermined number of sub-payloads, each sub-payload comprising respective redundancy information for the last sub-payload of a predetermined number of packets.

The redundancy information for a sub-payload other than the last sub-payload in the first packet may correspond to redundancy information for a sub-payload in the first packet.

The memory may further comprise code that, when executed on the at least one processor, causes the apparatus to receive sub-payloads for the first and second packets; and form the first and second packets by placing a predetermined number of sub-payloads into each of the first and second packets.

The memory may further comprise code that, when executed on the at least one processor, causes the apparatus to form the first and second packets by re-formatting each of the received sub-payloads prior to placing the predetermined number of sub-payloads into each of the first and second packets.

There is also provided a method comprising the steps of: attempting to receive a first packet comprising multiple sub-payloads having an order from first to last; receiving a second packet comprising multiple sub-payloads having an order from first to last, wherein the first sub-payload in the second packet comprises redundancy information for the last sub-payload in the first packet and the second sub-payload in the second packet comprises redundancy information for a sub-payload other than the last sub-payload in the first packet; and using the redundancy information to determine information in relation to the first packet.

The method may further comprise using the redundancy information for the last sub-payload to determine whether the last sub-payload was successfully received in the first packet; and if the last sub-payload was not successfully received, using the redundancy information for the last sub-payload to recover the last sub-payload.

The method may further comprise using the redundancy information for the sub-payload other than the last sub-payload to determine whether the sub-payload other than the last sub-payload was successfully received in the first packet; and if the sub-payload other than the last sub-payload was not successfully received, using the redundancy information for the sub-payload other than the last sub-payload to recover the sub-payload other than the last sub-payload.

The invention claimed is:

1. A method comprising:
   receiving at least a portion of a first packet that includes a first plurality of data portions;
   receiving at least a portion of a second packet that includes a second plurality of data portions, the first packet immediately preceding the second packet within a stream;
   wherein a first chronologically received data portion in the second packet includes first redundancy information for a last chronologically received data portion in the first packet and a second data portion in the second packet includes second redundancy information for a different data portion than the last data portion in the first packet; and
   using one or more of the first redundancy information or the second redundancy information to determine information in relation to the first packet.

2. A method as recited in claim 1, wherein said using comprises using the first redundancy information to determine whether the last data portion of the first packet was successfully received; and
   if the last data portion of the first packet was not successfully received, using the first redundancy information to recover the last data portion.

3. A method as recited in claim 1, wherein said using comprises using the second redundancy information to determine whether the different data portion was successfully received in the first packet; and
   if the different data portion was not successfully received, use the second redundancy information to recover the different data portion.

4. A method as recited in claim 1, wherein the first redundancy information comprises a lower bitrate version of the last data portion of the first packet.

5. A method as recited in claim 1, wherein the second data portion in the second packet comprises redundancy information for a first data portion in the first packet.

6. A method as recited in claim 1, wherein the second packet comprises data portions including respective redundancy information for last data portions of a predetermined number of other packets including the first packet.

7. A method as recited in claim 1, wherein the second packet comprises data portions including respective redundancy information for last data portions of a predetermined number of packets that precede the second packet including the first packet.

8. A method as recited in claim 1, further comprising one or more of:
   using the first redundancy information to perform one or more of correcting one or more errors in information included in the last data portion of the first packet; or
   using the first redundancy information to recover information lost from the last data portion of the first packet.

9. The method of claim 1, wherein the first packet and second packet include an equivalent session ID.

10. A method comprising:
receiving a first packet that includes a first plurality of data portions;
generating a second packet that includes a second plurality of data portions;
transmitting the first packet and the second packet, the first packet transmitted to immediately precede the second packet within a stream, wherein the second packet is generated such that a first chronologically transmitted data portion in the second packet includes first redundancy information for a last chronologically transmitted data portion in the first packet and a second data portion in the second packet includes second redundancy information for a different data portion than the last data portion in the first packet.

11. A method as recited in claim 10, wherein said generating the second packet comprises generating the first redundancy information as a lower bitrate version of the last data portion of the first packet.

12. A method as recited in claim 10, wherein the second data portion in the second packet comprises redundancy information for a first data portion in the first packet.

13. A method as recited in claim 10, further comprising, prior to transmitting the first packet, ordering individual data portions of the first plurality of data portions based on priority of the individual data portions.

14. A method as recited in claim 10, further comprising, prior to transmitting the first packet:
receiving a priority-based ordering from an application; and
ordering individual data portions of the first plurality of data portions based on the priority-based ordering.

15. A method as recited in claim 10, wherein said generating the second packet comprises generating the second packet to include respective redundancy information for last data portions of a predetermined number of packets that precede the second packet, including the first packet.

16. The method of claim 10, wherein the first packet and second packet include an equivalent session ID.

17. An apparatus comprising:
at least one hardware processor; and
a memory comprising code that is executable on the at least one processor to cause the apparatus to:
receive at least a portion of a first packet that includes a first plurality of data portions;
receive at least a portion of a second packet that includes a second plurality of data portions, wherein a first chronologically received data portion in the second packet includes first redundancy information for a last chronologically received data portion in the first packet and a second data portion in the second packet includes second redundancy information for a different data portion than the last data portion in the first packet, wherein the first packet immediately precedes the second packet within a stream; and
use one or more of the first redundancy information or the second redundancy information to determine information in relation to the first packet.

18. An apparatus as recited in claim 17, wherein the code is executable by the at least one processor to use the first redundancy information to determine whether the last data portion of the first packet was successfully received; and
if the last data portion of the first packet was not successfully received, use the first redundancy information to recover the last data portion.

19. An apparatus as recited in claim 17, wherein the code is executable by the at least one processor to perform one or more of:
using the first redundancy information to perform one or more of correcting one or more errors in information included in the last data portion of the first packet; or
using the first redundancy information to recover information lost from the last data portion of the first packet.

20. The apparatus of claim 17, wherein the first packet and second packet include an equivalent session ID.

21. An apparatus comprising:
at least one hardware processor; and
a memory comprising code that is executable on the at least one processor to cause the apparatus to:
receive a first packet that includes a first plurality of data portions;
generate a second packet that includes a second plurality of data portions;
transmit the first packet and the second packet, wherein a first chronologically transmitted data portion in the second packet includes first redundancy information for a last chronologically transmitted data portion in the first packet and a second data portion in the second packet includes second redundancy information for a different data portion than the last data portion in the first packet, wherein the first packet is transmitted to immediately precede the second packet within a stream.

22. An apparatus as recited in claim 21, wherein the code is executable by the at least one hardware processor to generate the first redundancy information as a lower bitrate version of the last data portion of the first packet.

23. An apparatus as recited in claim 21, wherein the code is executable by the at least one processor to, prior to transmitting the first packet, order individual data portions of the first plurality of data portions based on priority of the individual data portions.

24. An apparatus as recited in claim 21, wherein the code is executable by the at least one hardware processor to, prior to transmitting the first packet:
receive a priority-based ordering from an application; and
order individual data portions of the first plurality of data portions based on the priority-based ordering.

25. An apparatus as recited in claim 21, wherein the code is executable by the at least one hardware processor to generate the second packet to include respective redundancy information for last data portions of a predetermined number of packets that precede the second packet, including the first packet.

26. The apparatus of claim 21, wherein the first packet and second packet include an equivalent session ID.

27. A system comprising:
means for receiving at least a portion of a first packet that includes a first plurality of data portions;
means for receiving at least a portion of a second packet that includes a second plurality of data portions, wherein a first chronologically received data portion in the second packet includes first redundancy information for a last chronologically received data portion in the first packet and a second data portion in the second packet includes second redundancy information for a different data portion than the last data portion in the first packet, wherein the first packet immediate precedes the second packet within a stream; and
means for using one or more of the first redundancy information or the second redundancy information to determine information in relation to the first packet.

28. A system as recited in claim 27, wherein said using comprises using the first redundancy information to determine whether the last data portion of the first packet was successfully received; and
   if the last data portion of the first packet was not successfully received, using the first redundancy information to recover the last data portion.

29. A system as recited in claim 27, wherein said using comprises one or more of:
   using the first redundancy information to perform one or more of correcting one or more errors in information included in the last data portion of the first packet; or
   using the first redundancy information to recover information lost from the last data portion of the first packet.

30. The system of claim 27, wherein the first packet and second packet include an equivalent session ID.

31. The system of claim 27, wherein the first packet and second packet include information relating to a single chain of communication.

32. A system comprising:
   means for receiving a first packet that includes a first plurality of data portions;
   means for generating a second packet that includes a second plurality of data portions;
   means for transmitting the first packet and the second packet, wherein the first packet is transmitted to immediately precede the second packet within a stream, wherein a first chronologically transmitted data portion in the second packet includes first redundancy information for a last chronologically transmitted data portion in the first packet and a second data portion in the second packet includes second redundancy information for a different data portion than the last data portion in the first packet.

33. A system as recited in claim 32, wherein said generating the second packet comprises generating the first redundancy information as a lower bitrate version of the last data portion of the first packet.

34. A system as recited in claim 32, further comprising means for, prior to transmitting the first packet, ordering individual data portions of the first plurality of data portions based on priority of the individual data portions.

35. A system as recited in claim 32, further comprising means for, prior to transmitting the first packet:
   receiving a priority-based ordering from an application; and
   ordering individual data portions of the first plurality of data portions based on the priority-based ordering.

36. The system of claim 32, wherein the first packet and second packet include an equivalent session ID.

* * * * *